United States Patent
Qin

(10) Patent No.: US 12,149,812 B2
(45) Date of Patent: Nov. 19, 2024

(54) CAMERA DEVICE AND MOBILE TERMINAL

(71) Applicant: GUANGDONG OPPO MOBILE TELECOMMUNICATIONS CORP., LTD., Dongguan (CN)

(72) Inventor: Yong Qin, Dongguan (CN)

(73) Assignee: GUANGDONG OPPO MOBILE TELECOMMUNICATIONS CORP, LTD., Dongguan (CN)

( * ) Notice: Subject to any disclaimer, the term of this patent is extended or adjusted under 35 U.S.C. 154(b) by 181 days.

(21) Appl. No.: 17/983,801

(22) Filed: Nov. 9, 2022

(65) Prior Publication Data

US 2023/0179852 A1 Jun. 8, 2023

Related U.S. Application Data

(63) Continuation of application No. PCT/CN2021/082133, filed on Mar. 22, 2021.

(30) Foreign Application Priority Data

May 26, 2020 (CN) .......................... 202010456110.4
May 26, 2020 (CN) .......................... 202020905913.9

(51) Int. Cl.
*H04N 23/56* (2023.01)
*G03B 15/05* (2021.01)
(Continued)

(52) U.S. Cl.
CPC .......... *H04N 23/56* (2023.01); *H04M 1/0264* (2013.01); *H04N 23/51* (2023.01); *H04N 23/55* (2023.01); *G03B 15/05* (2013.01)

(58) Field of Classification Search
CPC ........ H04N 23/56; H04N 23/51; H04N 23/55; H04N 23/69; H04N 23/57; H04M 1/0264; G03B 15/05; G03B 5/00; G03B 30/00
See application file for complete search history.

(56) References Cited

U.S. PATENT DOCUMENTS

2009/0114280 A1 5/2009 Jensen et al.
2016/0165027 A1* 6/2016 Hahn .................. G06F 3/04164
455/566

FOREIGN PATENT DOCUMENTS

CN 1834769 A 9/2006
CN 102822739 A 12/2012
(Continued)

OTHER PUBLICATIONS

English Translation of CN 110708456 (Year: 2020).*
(Continued)

*Primary Examiner* — Twyler L Haskins
*Assistant Examiner* — Angel L Garces-Rivera
(74) *Attorney, Agent, or Firm* — Sheppard, Mullin, Richter & Hampton LLP

(57) ABSTRACT

Provided are a camera module and a mobile terminal. The mobile terminal includes a camera, a fill light source, and a light guide member. The light guide member has a first avoidance opening portion, and a first mounting space defined at a periphery of the first avoidance opening portion. An end of the camera adjacent to an object side is inserted into the first avoidance opening portion. The fill light source is disposed in the first mounting space. Light from the fill light source is guided to a field of view of the camera by the light guide member. The embodiments of the present disclosure further provide a mobile terminal.

18 Claims, 4 Drawing Sheets

(51) Int. Cl.
  *H04M 1/02*   (2006.01)
  *H04N 23/51*  (2023.01)
  *H04N 23/55*  (2023.01)

(56) References Cited

FOREIGN PATENT DOCUMENTS

| | | |
|---|---|---|
| CN | 103454768 A | 12/2013 |
| CN | 203673203 U | 6/2014 |
| CN | 102822739 B | 2/2015 |
| CN | 204758986 U | 11/2015 |
| CN | 106405985 A | 2/2017 |
| CN | 106568068 A | 4/2017 |
| CN | 106681082 A | 5/2017 |
| CN | 107483799 A | 12/2017 |
| CN | 107635090 A | 1/2018 |
| CN | 207117767 U | 3/2018 |
| CN | 108463770 A | 8/2018 |
| CN | 108965675 A | 12/2018 |
| CN | 110708456 A | 1/2020 |
| CN | 110753144 A | 2/2020 |
| CN | 110769161 A | 2/2020 |
| CN | 110891102 A | 3/2020 |
| CN | 111083341 A | 4/2020 |
| CN | 111107206 A | 5/2020 |
| CN | 111447313 A | 7/2020 |
| CN | 111510610 A | 8/2020 |
| CN | 111510611 A | 8/2020 |
| CN | 111510614 A | 8/2020 |
| CN | 111711770 A | 9/2020 |
| CN | 111970394 A | 11/2020 |
| CN | 211908933 U | 11/2020 |
| CN | 212324224 U | 1/2021 |
| CN | 212343814 U | 1/2021 |
| CN | 212367340 U | 1/2021 |
| CN | 212381272 U | 1/2021 |
| JP | 2005326720 A | 11/2005 |
| JP | 2008058471 A | 3/2008 |

OTHER PUBLICATIONS

English Translation of CN 110753144 (Year: 2020).*
International Search Report and Written Opinion dated Aug. 12, 2021 in International Application No. PCT/CN2021/095245. English translation attached.
First Office Action from corresponding Chinese Application No. 202110261137.2, dated Nov. 29, 2021. English translation attached.
The Second Office Action from corresponding Chinese Application No. 202110261137.2, dated Mar. 8, 2022. English translation attached.
Grant Notice & Supplementary Search from corresponding Chinese Application No. 202110261137.2, dated May 11, 2022. English translation attached.
International Search Report and Written Opinion dated Jun. 7, 2021 in International Application No. PCT/CN2021/082133. English translation attached.
The Grant Notice from corresponding Chinese Application No. 202020905913.9, dated Oct. 21, 2020. English translation attached.
Extended European Search Report dated Sep. 8, 2023 received in European Patent Application No. EP21813974.9.

* cited by examiner

CAMERA DEVICE AND MOBILE TERMINAL

CROSS-REFERENCE TO RELATED APPLICATION

This application is a continuation of International Application No. PCT/CN2021/082133, filed on Mar. 22, 2021, which is based on and claims priority to Chinese Patent Applications No. 202010456110.4 and No. 202020905913.9 that are filed on May 26, 2020, the entire disclosures of which are incorporated herein by reference.

FIELD

The present disclosure relates to the field of imaging technologies, and more particularly, to a camera module and a mobile terminal.

BACKGROUND

In order to meet different photographic needs of users, a variety of cameras having different functions are developed for mobile terminals, e.g., macro cameras, ultra-macro cameras, wide-angle cameras, long-focus cameras. The macro cameras are used for close-range macro capturing, and the ultra-macro cameras are used for ultra-macro capturing.

In the related art, not only a flash and a light guide member that are used to fill in light occupy a large mounting space within the mobile terminal, but also the flash is at a distance from the camera. When performing the close-range macro or ultra-macro capturing, a light level in a field of view is obviously insufficient since a distance between the camera and an object to be captured is usually only a few centimeters or even a few millimeters, and thus the object to be captured cannot be clearly captured.

SUMMARY

In view of this, embodiments of the present disclosure provide a camera module and a mobile terminal, which have compact structure and capable of providing sufficient light for a field of view in a close-range capturing mode.

To achieve the above objects, an embodiment of the present disclosure provides a camera module. The camera module includes a camera, a fill light source, and a light guide member. The light guide member has a first avoidance opening portion, and a first mounting space defined at a periphery of the first avoidance opening portion. An end of the camera close to an object side is inserted into the first avoidance opening portion. The fill light source is disposed in the first mounting space. The light guide member is configured to guide light from the fill light source to a field of view of the camera.

Further, one end of the first avoidance opening portion has a first opening, and another end of the first avoidance opening portion has a second opening. The first avoidance opening portion at least has a constriction segment gradually tapering from the one end where the first opening is located towards the other end where the second opening is located. The first mounting space is located at the periphery of the first avoidance opening portion close to the other end where the second opening is located.

Further, a side wall of the constriction segment is a light-emergent surface of the light guide member.

Further, a light-incident surface of the light guide member is located on a side of the first mounting space close to the first avoidance opening portion.

Further, the first avoidance opening portion has a first opening and a second opening that are defined on two opposite end surfaces of the light guide member, respectively. A part of the end surface having the second opening is recessed towards the end surface having the first opening to define the first mounting space.

Further, the light guide member includes a plurality of light guide sub-members arranged at intervals to define the first avoidance opening portion.

Further, a plurality of fill light sources is provided and arranged around the periphery of the first avoidance opening portion.

Further, the first avoidance opening portion has a first opening and a second opening that are defined on two opposite end surfaces of the light guide member, respectively, and the end surface having the second opening is a light-proof surface.

Another embodiment of the present disclosure further provides a mobile terminal. The mobile terminal includes: a housing including a front housing and a rear cover, an accommodation cavity being defined between the front housing and the rear cover; a mainboard disposed in the accommodation cavity, a second mounting space being defined between the mainboard and the rear cover, and a surface of the mainboard close to the second mounting space is a first surface; and the camera module as described above, the camera module being disposed in the second mounting space, and an end of the camera close to the mainboard being in contact with or spaced apart from the first surface.

Further, the camera is a functional camera. The mobile terminal further includes a main camera disposed in the second mounting space. The mainboard has a third avoidance opening. An end of the main camera close to the mainboard is inserted into the third avoidance opening.

Further, the functional camera is capable of imaging at an operation distance in an ultra-macro range of 3 mm to 10 mm.

Further, the mobile terminal further includes a protective lens covering an end of the camera module close to the object side.

Further, the protective lens and the light guide member are integrally formed.

Further, the mobile terminal further includes a flexible circuit board electrically connected to the mainboard. The fill light source is disposed on the flexible circuit board.

According to the embodiments of the present disclosure, the camera module and the mobile terminal are provided. By inserting the end of the camera close to the object side into the first avoidance opening portion of the light guide member, and disposing the fill light source in the first mounting space of the light guide member, the light from the fill light source can be guided to a field of view of the camera from all sides of the camera, which not only ensures that the camera module can have a more compact structure, but also provides sufficient light for the field of view of the camera in the close-range capturing mode. In this way, an object to be captured in the field of view can be clearly captured.

DESCRIPTION OF EMBODIMENTS

The present disclosure is described in further detail below in conjunction with the accompanying drawings and specific embodiments.

It should be noted that the embodiments and technical features in the embodiments of the present disclosure can be combined with each other without conflict. Detailed description in specific embodiments should be understood as explanatory description of the purpose of the present disclosure and should not be construed as an undue limitation of the present disclosure.

Figure 1:
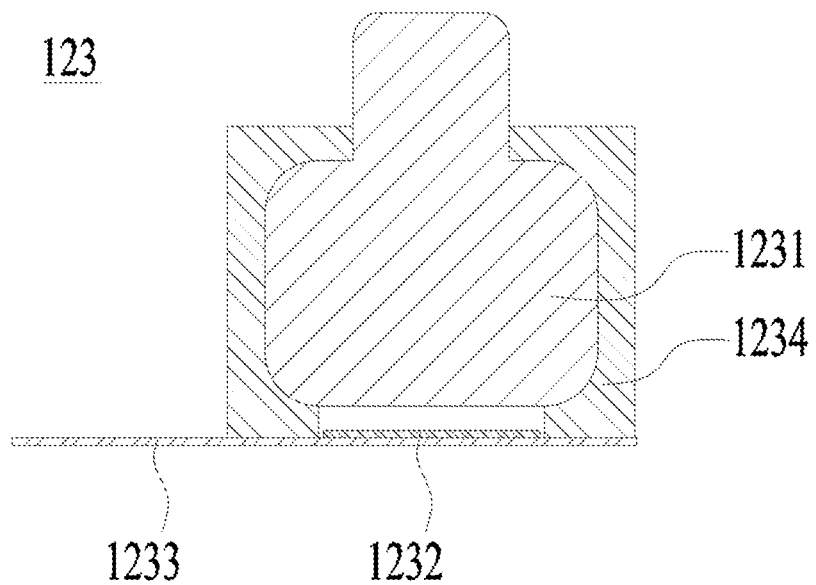
FIG. 1 is a schematic structural view of a camera according to an embodiment of the present disclosure.
Figure 2:
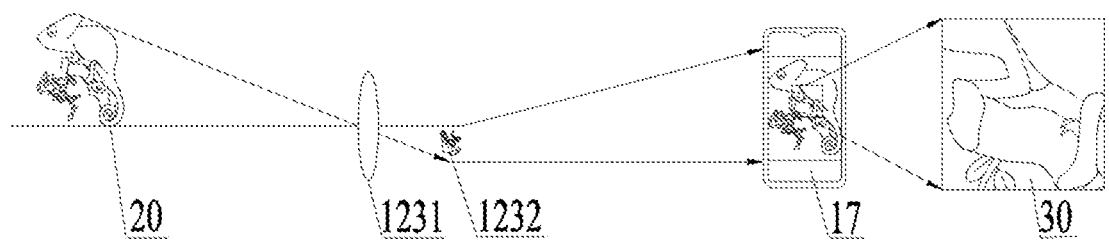
FIG. 2 is a schematic view showing capturing an object to be captured by a mobile phone.

Referring to FIG. 1 and FIG. 2, a camera 123 described in the present disclosure includes a lens 1231, a sensor (an image sensor) 1232, a Printed Circuit Board (PCB) 1233, and a holder 1234. The sensor 1232 includes, but is not limited to, a Charged Coupled Device (CCD) and a Complementary Metal Oxide Semiconductor (CMOS). The sensor 1232 is fixed on the PCB 1233. The holder 1234 is disposed on a side of the sensor 1232 close to an object 20 to be captured and is connected to the PCB 1233. The holder 1234 has a cavity for accommodating the lens 1231. The lens 1231 is opposite to the sensor 1232. In a photo taking process, light from the object 20 to be captured enters the camera 123. Incident light first enters the lens 1231 and then reaches the sensor 1232. Photons in the light generate movable charges when impinging on the sensor 1232, which is called an internal photoelectric effect. The movable charges are brought together to form an electrical signal. After a digital-to-analog conversion of an Analog to Digital (A/D) converter, the electrical signal is converted into a digital signal. The digital signal is then transmitted to a Digital Signal Processor (DSP) to be processed and finally transmitted to a screen 17 of a terminal device to form a display image. That is, the object 20 to be captured is photographed. In some embodiments, a structure of the DSP includes an Image Signal Processor (ISP) and a JPEG encoder (JPEG image decoder). The ISP is a key factor for determining smoothness of images. It should be understood that for the CMOS, the DSP may be integrated within the CMOS. The CMOS has advantages such as high integration, low power consumption, low costs, etc., and is therefore more suitable for a mobile phone having a limited internal space.

The PCB 1233 may be a hard board, a soft board, or a combination thereof. When the mobile phone uses the CMOS, the CMOS may be adapted to any of the hard board, the soft board, or the combination thereof. When the mobile phone uses the CCD, only the combination of the hard and soft boards can be used. However, the combination of the hard and soft boards is the most expensive among the above three types of boards, thereby resulting in high costs for the mobile phone when the CCD is used.

In some embodiments, the camera may be a macro camera. The macro camera refers to a camera that performs, based on an optical capability of the lens 1231 and at a close distance from the object to be captured, capturing at a large optical magnification under the premise of ensuring clear imaging of the object to be captured. The optical magnification refers to a ratio between an imaging height of the sensor and a height of the object to be captured.

It should be noted that user-perceived magnification=optical magnification*screen magnification*digital magnification, where the optical magnification refers to the ratio between the imaging height of the sensor and the height of the object to be captured, the screen magnification refers to a ratio between a size of the screen to a size of the sensor, and the digital magnification refers to a ratio between a size of a magnified part, which is obtained after a zoom-in operation is performed on a part of a screen by a user and a size of the part of the screen before the zoom-in operation is performed. In a further embodiment, principles of magnification of an image perceived by the user after capturing are illustrated by examples. As illustrated in FIG. 2, light reflected from the object 20 to be captured reaches the sensor 1232 after passing through the lens 1231, and then an electrical signal is generated. The electrical signal is converted into a digital signal by an analog-to-digital converter device. After processed by a digital signal processing chip (or the DSP), the digital signal is transmitted to the screen 17 of the mobile terminal to form an image. The image can be zoomed in by the user on the screen 17 as desired, in which case the image displayed on the screen 17 is a screen zoomed-in image 30.

In some embodiments, according to basic optical imaging principles, tan(FOV/2)=imaging height/focal length=height of the object to be captured/object distance, and optical magnification=imaging height/height of the object to be captured=focal length/object distance, where FOV refers to a Field Of View. In an optical instrument, the FOV refers to an included angle formed, with a center of a lens of the optical instrument as a vertex, by two edges of a maximum range in which the object to be measured or captured can pass through the center of the lens. The FOV is usually used to measure a field range of the lens. For example, an angle of view of a conventional standard lens is about 45 degrees, and an angle of view of a wide-angle lens 1231 is above 60 degrees. According to the above calculation formula for the optical magnification, the optical magnification can be increased by shortening an operation distance or increasing the focal length, i.e., by bringing the lens 1231 as close as possible to the object to be captured and increasing the focal length of the lens 1231 under the premise of ensuring clear imaging. The operation distance refers to a distance from the object to be captured to a front end of the lens.

According to Gaussian imaging formula, $1/f=1/u+1/v$, where f represents the focal length, u represents an object distance, and v represents an image distance.

When u>2f, the object to be captured is imaged as a reduced inverted real image on the sensor 1232.

When u=2f and v=f, i.e., the focal length is equal to the image distance, the object to be captured is imaged as an equal inverted real image on the sensor 1232.

When f<u<2f, the object to be captured is imaged into a magnified inverted real image on the sensor 1232.

When u=f, the object to be captured is not imaged on the sensor 1232.

When u<f, a virtual image is imaged and it is impossible for the object to be captured to be imaged as a real image on the sensor 1232.

Therefore, with a constant focal length f, v and u follow opposite trends. When u increases, v decreases; and when u decreases, v increases. Since macro capturing is a way of capturing at a close range to obtain a zoom-in image of the object to be captured, i.e., the object to be captured is imaged as a magnified real image on the sensor, the object distance u is small for close-range macro capturing, and correspondingly the operation distance is short. Therefore, the focal length of the lens 1231 needs to be small to meet the need for focusing, to ensure that f<u<2f and that the image distance and the object distance satisfy the above Gaussian imaging formula.

In the photographic industry, it is internationally accepted that capturing at an optical magnification in an approximate range of 1:1 to 1:4 is a macro photography. In the embodiments of the present disclosure, an ultra-macro camera refers to a macro camera that can still achieve focusing when the operation distance is smaller than 10 mm. That is, the sensor can still achieve clear imaging when the operation distance is smaller than 10 mm. It should be noted that in the embodiments of the present disclosure, the term "smaller than" cannot be construed as "equal to". In an embodiment, an ultra-macro range ranges from 3 mm to 9 mm, which means that the ultra-macro camera can realize imaging when the operation distance ranges from 3 mm to 9 mm, and an image can be clearly formed on the sensor 1232.

The ultra-macro camera may be a long-focus ultra-macro lens or a wide-angle ultra-macro lens. For example, the wide-angle ultra-macro lens has a focal length f ranging from 1.3 mm to 2.2 mm and a FOV ranging from 70° to 78°. For example, the wide-angle ultra-macro lens has an effective focal length f of 1.335 mm, a FOV of 77.6° at a maximum image height and an aperture value (f-number) of 2.8, and is capable of realizing clear imaging at the operation distance of 3 mm. That is, the lens 1231 is able to focus on the object to be captured at an operation distance of about 3 mm.

In the embodiments of the present disclosure, "plurality of" means two or more.

In the embodiments of the present disclosure, the field of view refers to a region in which the object to be captured can be seen on the screen of the mobile terminal; and the object side refers to a side close to the object to be captured.

In the embodiments of the present disclosure, the mobile terminal may include a terminal device such as a mobile phone, a laptop, a tablet computer, a Personal Digital Assistant (PDA), and a portable computer. For ease of description, the mobile terminal according to the embodiments of the present disclosure is described taking the mobile phone as an example.

Figure 3:
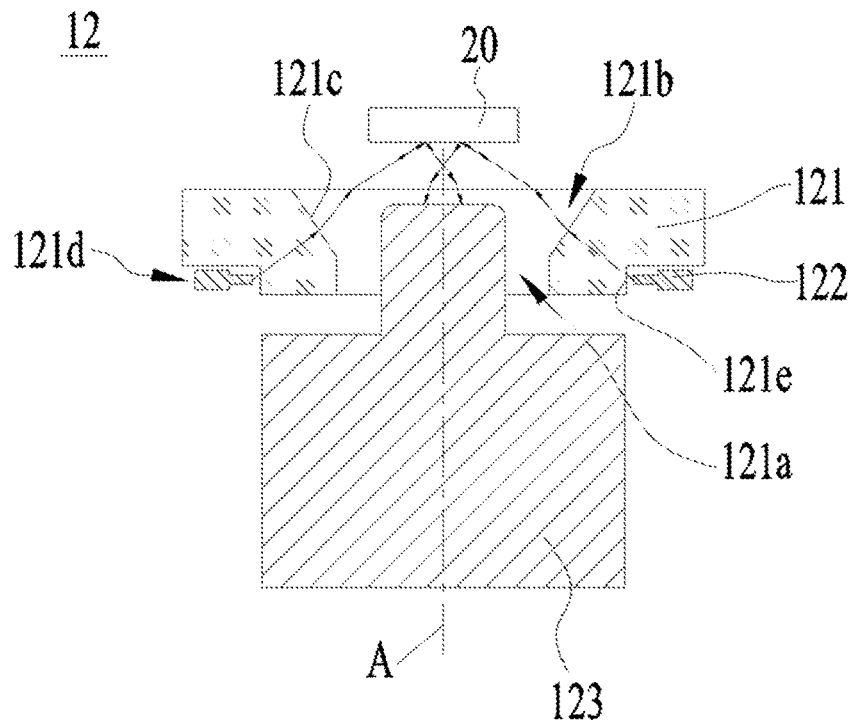
FIG. 3 is a partial sectional view of a camera module according to an embodiment of the present disclosure, in which continuous arrows represent a propagation direction of lights, and an object to be captured is illustrated.

According to an embodiment of the present disclosure, a camera module is provided. Referring to FIG. 3, the camera module 12 includes a camera 123, a fill light source 122, and a light guide member 121. The light guide member 121 has a first avoidance opening portion 121a, and a first mounting space 121d defined at a periphery of the first avoidance opening portion 121a. An end of the camera 123 close to the object side is inserted into the first avoidance opening portion 121a, which is equivalent to that the camera 123 is surrounded by the light guide member 121. The fill light source 122 is disposed in the first mounting space 121d, which is equivalent to that the fill light source 122 is hidden in the light guide member 121. The light guide member 121 is configured to guide light from the fill light source 122 to a field of view of the camera 123.

With the mobile terminal 10 according to the embodiments of the present disclosure, by inserting the end of the camera 123 close to the object side into the first avoidance opening portion 121a of the light guide member 121, and disposing the fill light source 122 in the first mounting space 121d of the light guide member 121, the light from the fill light source 122 can be guided to the field of view of the camera 123 from all sides of the camera 123. Therefore, it can be ensured that sufficient light can be provided to the field of view of the camera 123 in a close-range capturing mode. In this way, an object 20 to be captured in the field of view can be clearly captured.

In addition, by disposing the fill light source 122 in the first mounting space 121d of the light guide member 121, it is possible to facilitate light guiding, and allow an overall structure of the camera module 12 to be more compact.

Figure 6:
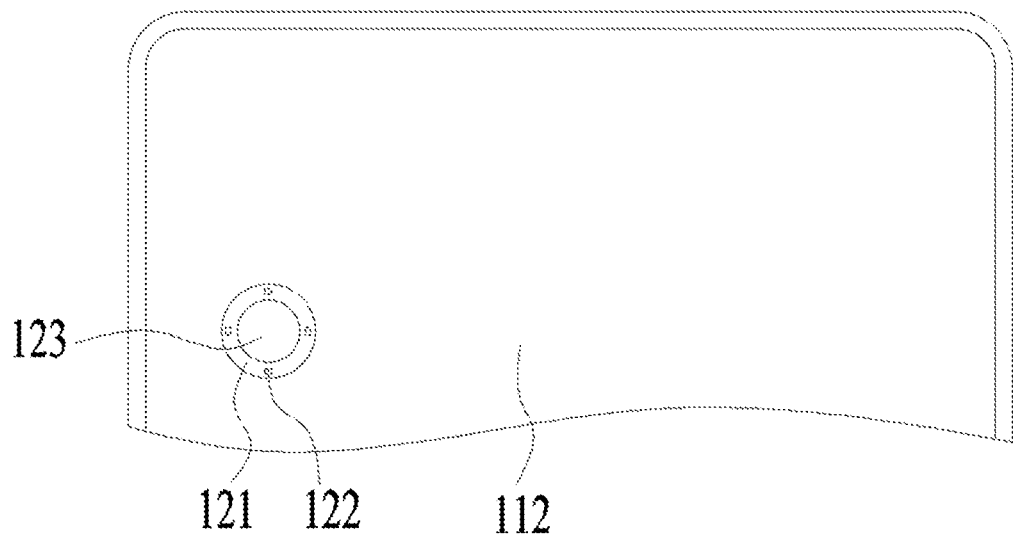
FIG. 6 is a schematic partial view of an external structure of the mobile terminal illustrated in FIG. 3.

Referring to FIG. 6, the light guide member 121 according to the embodiments of the present disclosure is of a continuous annular structure. In some embodiments, the light guide member 121 according to the embodiments of the present disclosure has a circular shape. To improve uniformity of fill light, in the embodiments of the present disclosure, a plurality of fill light sources 122 is provided and arranged at intervals in a circumferential direction of the camera 123. An included angle between any two adjacent fill light sources 122 may be the same or different.

It should be understood that the light guide member 121 is not limited to the circular annular structure. In other embodiments, an outer ring of the annular light guide member 121 may also be of a rectangular shape, a triangular shape, an oval shape, a special shape, etc., and an inner ring of the annular light guide member 121 may be of any of a circular shape, a rectangular shape, a triangular shape, an oval shape, a special shape, etc. That is, the outer and inner rings of the annular light guide member 121 may be of the same shape or different shapes, and are not limited to any of these examples.

Figure 7:
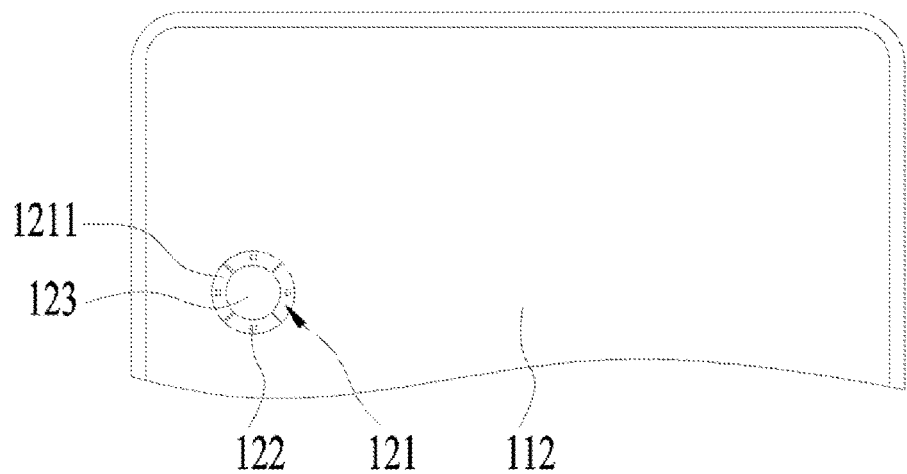
FIG. 7 is a schematic partial view of an external structure of a mobile terminal according to yet another embodiment of the present disclosure.

In other embodiments, the light guide member 121 may have no continuous annular structure. For example, referring to FIG. 7, in another embodiment, the light guide member 121 may include a plurality of light guide sub-members 1211 arranged at intervals to define the first avoidance opening portion 121a. Similarly, to improve the uniformity of the fill light, one or more fill light sources 122 may be provided for each light guide sub-member 1211 correspondingly.

The fill light source 122 according to the embodiments of the present disclosure may be any one of a Light Emitting Diode (LED) light, a metal halide light, a fluorescent light, a high pressure sodium light, an incandescent light, an iodine-tungsten light, or a high intensity discharge lamp. For example, in an embodiment, the fill light source 122 is an LED light, which has stable operation, low heat generation, low energy consumption, and long service life.

Referring to FIG. 3, the first avoidance opening portion 121a according to the embodiment of the present disclosure has a first opening defined at one end thereof and a second opening defined at another end thereof. The first avoidance opening portion 121a at least has a constriction segment 121b gradually tapering from the one end where the first opening is located towards another end where the second opening is located. The first mounting space 121d is located at a periphery of the first avoidance opening portion 121a close to the other end where the second opening is located. That is, an opening diameter of the constriction segment 121b on a side close to the first opening is greater than an opening diameter of the constriction segment 121b on a side facing away from the first opening. Therefore, it is possible to facilitate emission of the light reflected from the object 20 to be captured onto the camera 123 for final imaging when the camera 123 performs the capturing.

In this embodiment, the first avoidance opening portion 121a has the constriction segment 121b, and a straight segment connected to an end of the constriction segment 121b facing away from the first opening. The first opening of the first avoidance opening portion 121a is equivalent to an opening of the constriction segment 121b, and the second opening is equivalent to an opening of the straight segment. The first mounting space 121d is actually located at a periphery of the straight segment. In other embodiments, the straight segment may also be connected to an end of the constriction segment 121b facing away from the second opening, or both ends of the constriction segment 121b may be provided with the straight segments. In other embodiments, no straight segment may be provided.

Referring to FIG. 3, in this embodiment of the present disclosure, a side wall of the constriction segment 121b is a light-emergent surface 121c of the light guide member 121. That is, after entering the light guide member 121 from a light-incident surface 121e of the light guide member 121, the light from the fill light source 122 may exit from the side wall of the constriction segment 121b and be guided to the field of view of the camera 123. That is, the first avoidance opening portion 121a is both a capturing hole of the camera 123 and a light-emergent hole of the camera module 12. Therefore, it can be ensured that relative illumination in the field of view of the camera 123 can meet capturing requirements when the camera 123 performs the capturing, especially the close-range capturing.

In this embodiment, the light emitted from the fill light source 122 is mainly transmitted from the light-incident surface 121e of the light guide member 121 to the light-emergent surface 121c of the light guide member 121 along a straight path. In other embodiments, the light emitted from the fill light source 122 may also enter an interior of the light guide member 121 from the light-incident surface 121e of the light guide member 121, and then be reflected several times in the light guide member 121 before being transmitted to the light-emergent surface 121c of the light guide member 121.

It should be understood that in other embodiments, a separate light-emergent hole may also be defined at an outer periphery of the first avoidance opening portion 121a. Light guided out by the light guide member 121 is directed to the field of view of the camera 123 by the light-emergent hole. That is, the first avoidance opening portion 121a is used only as the capturing hole for the camera 123, and the light guided out by the light guide member 121 does not pass through the first avoidance opening portion 121a.

The side wall of the constriction segment 121b may also not be the light-emergent surface. For example, in other embodiments, an end surface of the light guide member 121 at a side where the first opening is defined may be regarded as the light-emergent surface.

Referring to FIG. 3, in this embodiment of the present disclosure, a part of the end surface having the second opening is recessed towards the end surface having the first opening to define the first mounting space 121d. In other embodiments, a part of a side wall of the light guide member 121 may be recessed towards the first avoidance opening portion 121a to define the first mounting space 121d, or the first mounting space 121d may be formed in the interior of the light guide member 121.

Further, referring to FIG. 3, according to this embodiment of the present disclosure, the light-incident surface 121e of the light guide member 121 is located on a side of the first mounting space 121d close to the first avoidance opening portion 121a. In some embodiments, the light-incident surface 121e according to this embodiment is parallel to an optical axis A of the camera 123. Thus, it is possible to facilitate an arrangement of the fill light source 122 in the first mounting space 121d. In addition, the light from the fill light source 122 can be easily guided to the side wall of the constriction segment 121b from the light-incident surface 121e and exit at the side wall of the constriction segment 121b.

In other embodiments, the light-incident surface 121e may also not be parallel to the optical axis A of the camera 123. For example, the light-incident surface 121e may be angled to the optical axis A. Further, in an embodiment, the light-incident surface 121e may be perpendicular to the optical axis A.

In addition, since the light guide member 121 is made of a light-transmitting material, in order to prevent the user from seeing an internal structure of the mobile terminal 10 through the light guide member 121, the end surface of the light guide member 121 having the second opening may be formed as a light-proof surface. For example, the end surface of the light guide member 121 having the second opening may be frosted to achieve a sanding effect.

Figure 4:
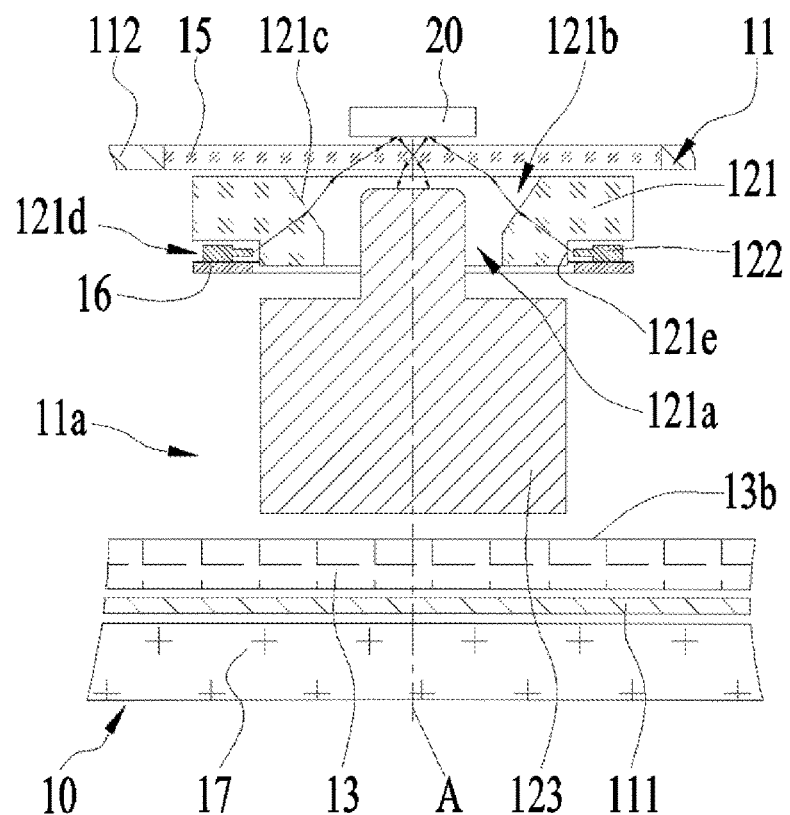
FIG. 4 is a partial sectional view of a mobile terminal having the camera module illustrated in FIG. 3, in which continuous arrows represent a propagation direction of lights, and an object to be captured is illustrated.

According to another embodiment of the present disclosure, a mobile terminal is further provided. Referring to FIG. 4, the mobile terminal 10 according to the embodiment of the present disclosure includes a housing 11, a mainboard 13, and the camera module 12 according to any of the above embodiments. The housing 11 includes a front housing 111 and a rear cover 112. An accommodation cavity is defined between the front housing 111 and the rear cover 112. The mainboard 13 is disposed in the accommodation cavity. A second mounting space 11a is defined between the mainboard 13 and the rear cover 112. A surface of the mainboard 13 close to the second mounting space 11a is a first surface 13b. The camera module 12 is disposed in the second mounting space 11a. An end of the camera 123 close to the mainboard 13 is in contact with or spaced apart from the first surface 13b. That is, the camera 123 is only disposed at a side of the mainboard 13, and the mainboard 13 does not have a corresponding avoidance structure for the camera 123, e.g., the avoidance opening. Therefore, when setting up the camera 123, an original structure of the mainboard 13 will not be damaged, which in turn can not affect wiring of the mainboard 13 and an arrangement of relevant components.

Referring to FIG. 4, the mobile terminal 10 according to this embodiment of the present disclosure also includes a flexible circuit board 16. The fill light source 122 is disposed on the flexible circuit board 16. In some embodiments, the fill light source 122 may be soldered onto the flexible circuit board 16. The flexible circuit board 16 is electrically connected to the mainboard 13. Since a predetermined spacing is formed between the fill light source 122 and the mainboard 13, an electrical connection between the fill light source 122 and the mainboard 13 can be facilitated by providing the flexible circuit board 16.

It should be understood that in other embodiments, instead of providing the flexible circuit board 16, the fill light source 122 may be electrically connected to the mainboard 13 directly.

Referring to FIG. 4, the mobile terminal 10 according to this embodiment of the present disclosure further includes a protective lens 15 covering an end of the camera module 12 close to the object side. The protective lens 15 mainly serves to protect the camera module 12. The light from the light-emergent surface 121c of the light guide member 121c is guided to the field of view of the camera 123 after passing through the protective lens 15. Similarly, the light reflected from the object 20 to be captured is also directed to the camera 123 after passing through the protective lens 15, and the imaging is finally realized.

The protective lens 15 may be disposed directly on the rear cover 112; or a decorative cover may be disposed on the rear cover 112, and the protective lens 15 is disposed on the decorative cover. When the protective lens 15 is disposed on the decorative cover, a flange may be formed on an outer surface of the light guide member 121. The decorative cover is pressed against the flange to fix the decorative cover and the light guide member 121.

Figure 5:
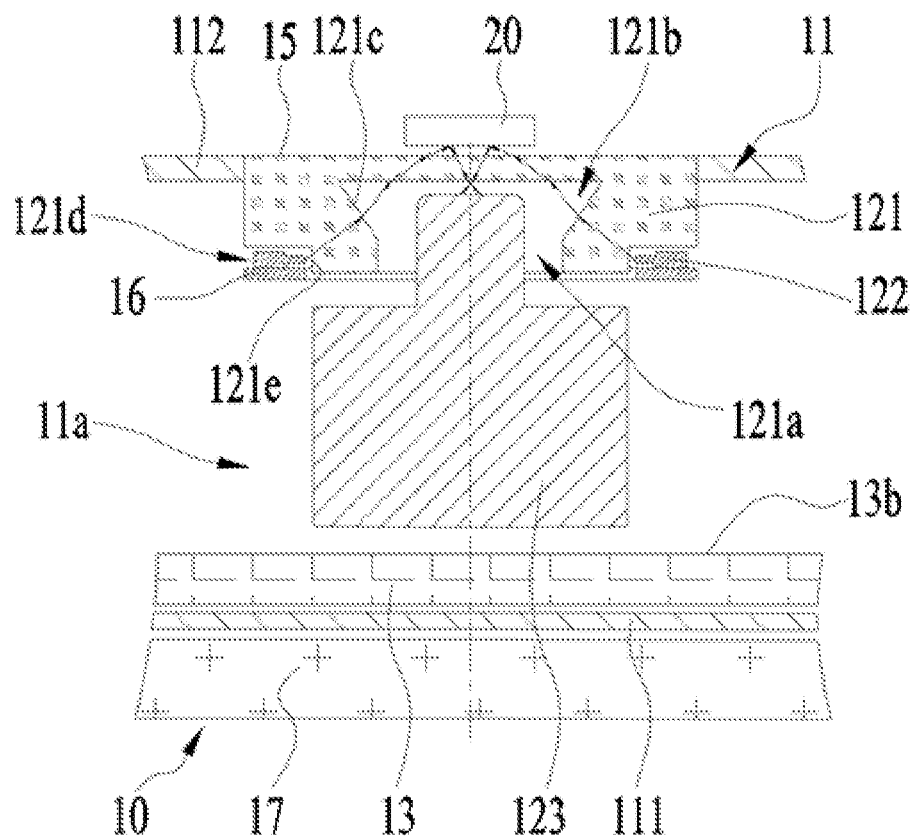
FIG. 5 is a partial sectional view of a mobile terminal according to another embodiment of the present disclosure, in which continuous arrows represent a propagation direction of lights, and an object to be captured is illustrated.

In this embodiment of the present disclosure, the protective lens 15 and the light guide member 121 are two separate structures. Referring to FIG. 5, in another embodiment, the protective lens 15 and the light guide member 121 may be integrally formed. That is, a structure of the light guide member 121 may be partially used as the protective lens 15 to further reduce an overall thickness of the mobile phone.

Figure 8:
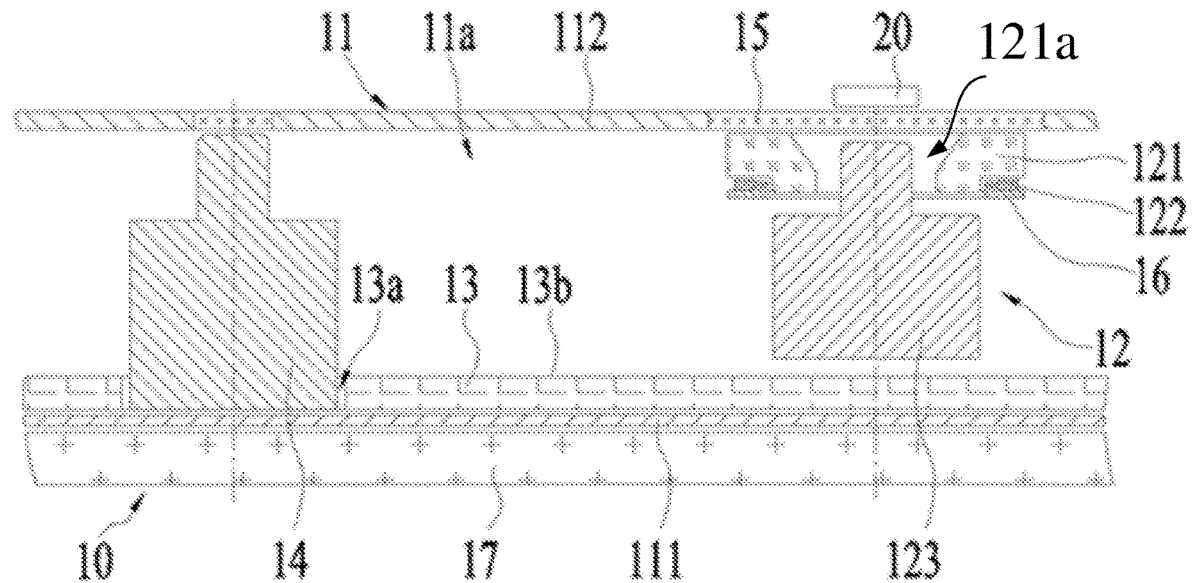
FIG. 8 is a partial sectional view of a mobile terminal according to still yet another embodiment of the present disclosure, in which an object to be captured is illustrated.

Referring to FIG. 8, in an embodiment, the camera 123 is a functional camera. The mobile terminal 10 further includes a main camera 14 disposed in the second mounting space 11a. The mainboard 13 has a third avoidance opening 13a. An end of the main camera 14 close to the mainboard 13 is inserted into the third avoidance opening 13a. That is, in this embodiment, both the main camera 14 and the functional camera are disposed on the mobile terminal 10. In an embodiment, the functional camera may be a camera capable of imaging at an operation distance within the ultra-macro range of 3 mm to 10 mm. That is, the functional camera may be the ultra-macro camera. In other embodiments, the functional camera may also be the macro camera, the wide-angle camera, the long-focus camera, or the like.

In some embodiments, the main camera 14 has an external dimension generally greater than that of the functional camera. To ensure that the mobile terminal 10 can be as thin and light as possible, according to this embodiment, the third avoidance opening 13a on the mainboard 13 is provided for the main camera 14, and the end of the main camera 14 close to the mainboard 13 is inserted into the third avoidance opening 13a, to reduce a space occupied by the main camera 14 in a thickness direction of the mobile phone. Also, an end of the functional camera close to the rear cover 112 is inserted into the first avoidance opening portion 121a of the light guide member 121. Therefore, without increasing the thickness of the mobile terminal 10, it is not only unnecessary to form a corresponding avoidance hole and other avoidance structures for the functional camera on the mainboard 13, but also ensure that the functional camera in the close-range capturing mode can provide sufficient light for a field of view of the functional camera.

While preferred embodiments of the present disclosure have been described above, the present disclosure is not limited to these embodiments. It is conceivable for those skilled in the art to make various changes and variations to the present disclosure. Any modification, equivalent substitution, improvement, etc., made within the spirit and principles of the present disclosure shall be included within the scope of the present disclosure.

What is claimed is:

1. A camera module, comprising:
a camera;
a fill light source; and
a light guide member, wherein:
the light guide member has a first avoidance opening portion, and a first mounting space defined at a periphery of the first avoidance opening portion,
an end of the camera close to an object side is inserted into the first avoidance opening portion,
the fill light source is disposed in the first mounting space, and
the light guide member is configured to guide light from the fill light source to a field of view of the camera, wherein:
the first avoidance opening portion has a first opening and a second opening that are defined on two opposite end surfaces of the light guide member, respectively, and
a part of the end surface having the second opening is recessed towards the end surface having the first opening to define the first mounting space.

2. The camera module according to claim 1, wherein:
one end of the first avoidance opening portion has a first opening, and another end of the first avoidance opening portion has a second opening,
the first avoidance opening portion at least has a constriction segment gradually tapering from the one end where the first opening is located towards the other end where the second opening is located, and
the first mounting space is located at the periphery of the first avoidance opening portion close to the other end where the second opening is located.

3. The camera module according to claim 2, wherein a side wall of the constriction segment is a light-emergent surface of the light guide member.

4. The camera module according to claim 3, wherein a light-incident surface of the light guide member is located on a side of the first mounting space close to the first avoidance opening portion.

5. The camera module according to claim 1, wherein the light guide member comprises a plurality of light guide sub-members arranged at intervals to define the first avoidance opening portion.

6. The camera module according to claim 1, wherein a plurality of fill light sources is provided and arranged around the periphery of the first avoidance opening portion.

7. The camera module according to claim 1, wherein:
the first avoidance opening portion has a first opening and a second opening that are defined on two opposite end surfaces of the light guide member, respectively, and
the end surface having the second opening is a light-proof surface.

8. A mobile terminal, comprising:
a housing comprising a front housing and a rear cover, wherein an accommodation cavity is defined between the front housing and the rear cover;
a mainboard disposed in the accommodation cavity, wherein a second mounting space is defined between the mainboard and the rear cover, and wherein a surface of the mainboard close to the second mounting space is a first surface; and
a camera module, the camera module being disposed in the second mounting space and comprising:
a camera;

a fill light source; and a light guide member, wherein:

the light guide member has a first avoidance opening portion, and a first mounting space defined at a periphery of the first avoidance opening portion, an end of the camera close to an object side is inserted into the first avoidance opening portion, the fill light source is disposed in the first mounting space, and the light guide member is configured to guide light from the fill light source to a field of view of the camera, wherein an end of the camera close to the mainboard is in contact with or spaced apart from the first surface;

wherein the first avoidance opening portion has a first opening and a second opening that are defined on two opposite end surfaces of the light guide member, respectively; and wherein a part of the end surface having the second opening is recessed towards the end surface having the first opening to define the first mounting space.

9. The mobile terminal according to claim 8, wherein:

one end of the first avoidance opening portion has a first opening, and another end of the first avoidance opening portion has a second opening, the first avoidance opening portion at least has a constriction segment gradually tapering from the one end where the first opening is located towards the other end where the second opening is located, and the first mounting space is located at the periphery of the first avoidance opening portion close to the other end where the second opening is located.

10. The mobile terminal according to claim 9, wherein a side wall of the constriction segment is a light-emergent surface of the light guide member.

11. The mobile terminal according to claim 10, wherein a light-incident surface of the light guide member is located on a side of the first mounting space close to the first avoidance opening portion.

12. The mobile terminal according to claim 8, wherein the light guide member comprises a plurality of light guide sub-members arranged at intervals to define the first avoidance opening portion.

13. The mobile terminal according to claim 8, wherein a plurality of fill light sources is provided and arranged around the periphery of the first avoidance opening portion.

14. The mobile terminal according to claim 8, wherein:

the camera is a functional camera, the mobile terminal further comprises a main camera disposed in the second mounting space, the mainboard has a third avoidance opening, and an end of the main camera close to the mainboard is inserted into the third avoidance opening.

15. The mobile terminal according to claim 14, wherein the functional camera is capable of imaging at an operation distance in an ultra-macro range of 3 mm to 10 mm.

16. The mobile terminal according to claim 8, further comprising a protective lens covering an end of the camera module close to the object side.

17. The mobile terminal according to claim 16, wherein the protective lens and the light guide member are integrally formed.

18. The mobile terminal according to claim 8, further comprising a flexible circuit board electrically connected to the mainboard, wherein the fill light source is disposed on the flexible circuit board.

* * * * *